Dec. 28, 1937.   J. J. SEIP   2,103,796
APPARATUS FOR SEPARATING SOLIDS FROM LIQUIDS
Original Filed Sept. 16, 1932   3 Sheets-Sheet 1
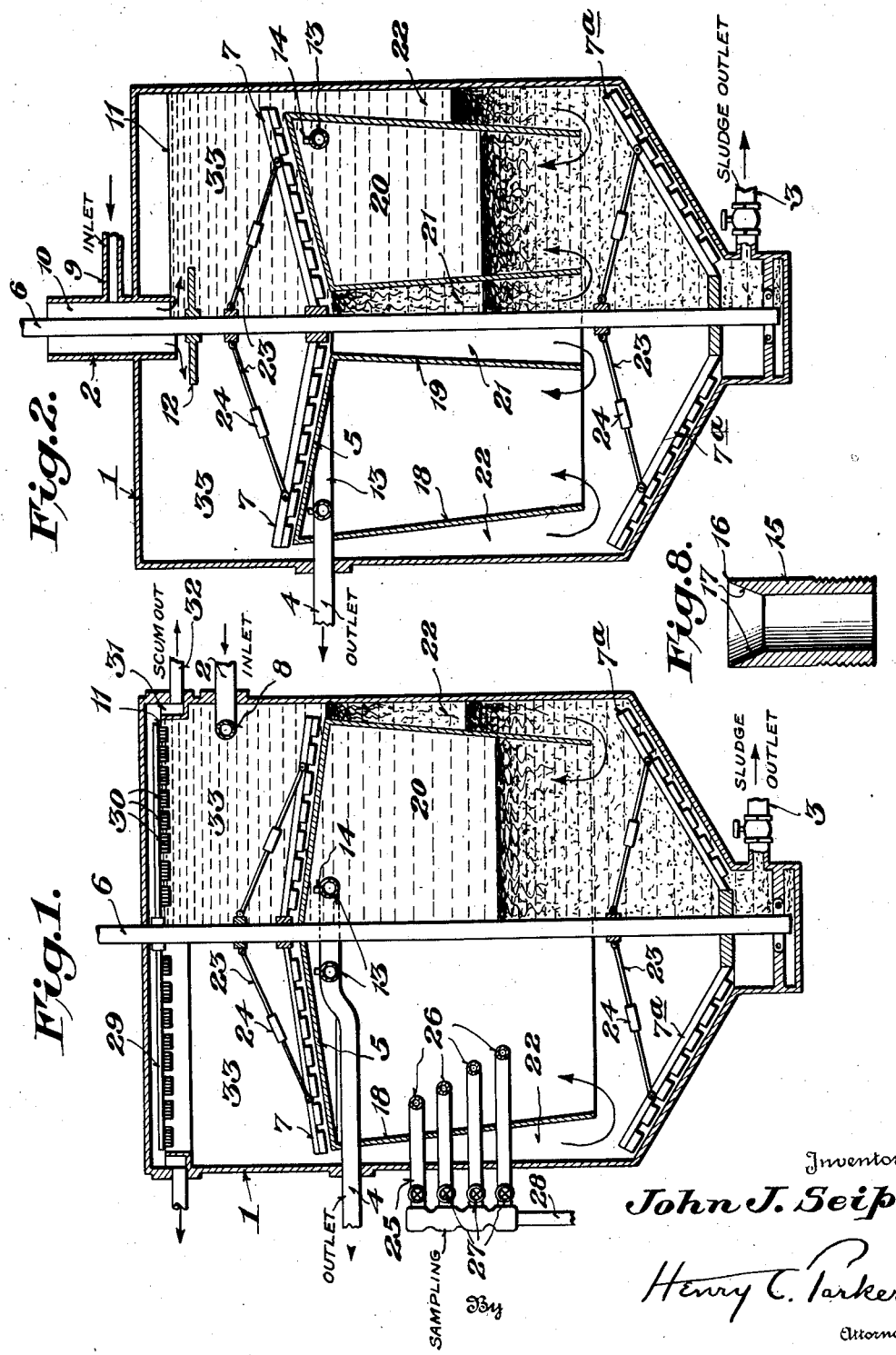

Dec. 28, 1937.     J. J. SEIP     2,103,796
APPARATUS FOR SEPARATING SOLIDS FROM LIQUIDS
Original Filed Sept. 16, 1932     3 Sheets-Sheet 2
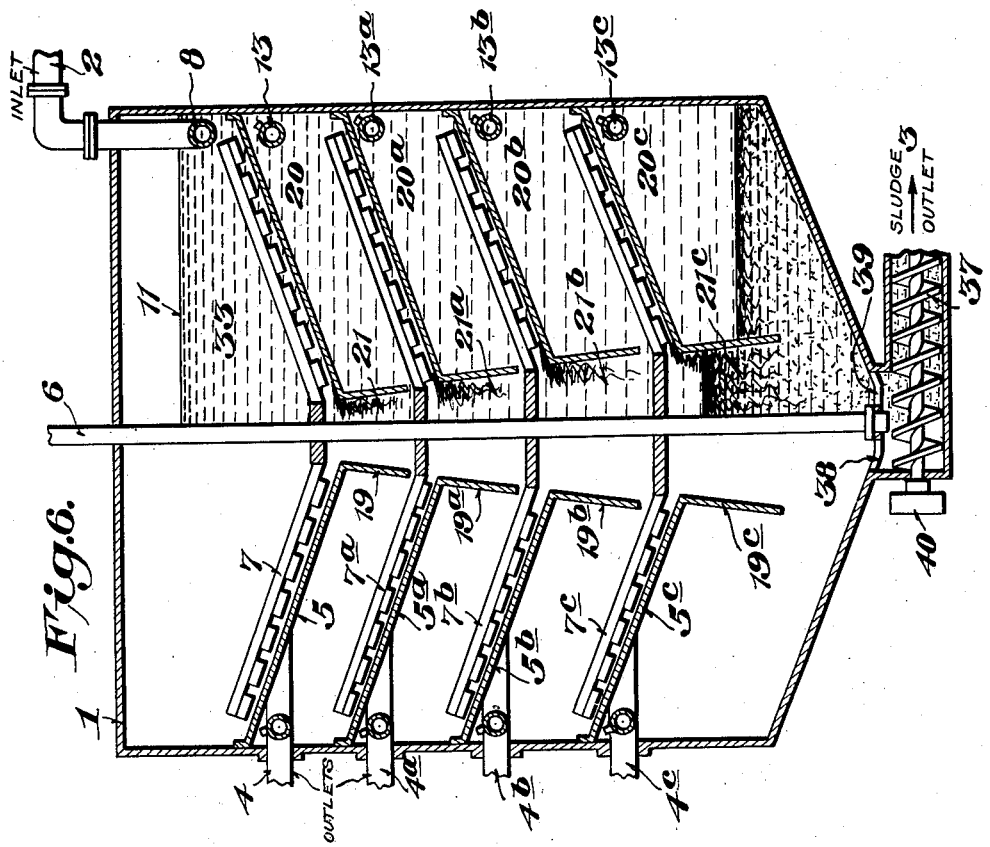
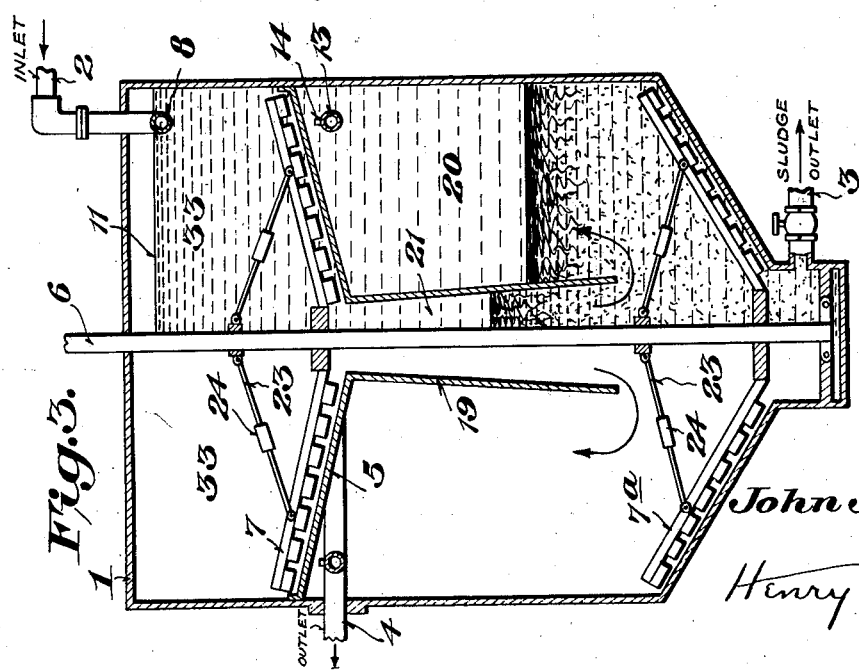
Inventor
John J. Seip,
Henry C. Parker
Attorney

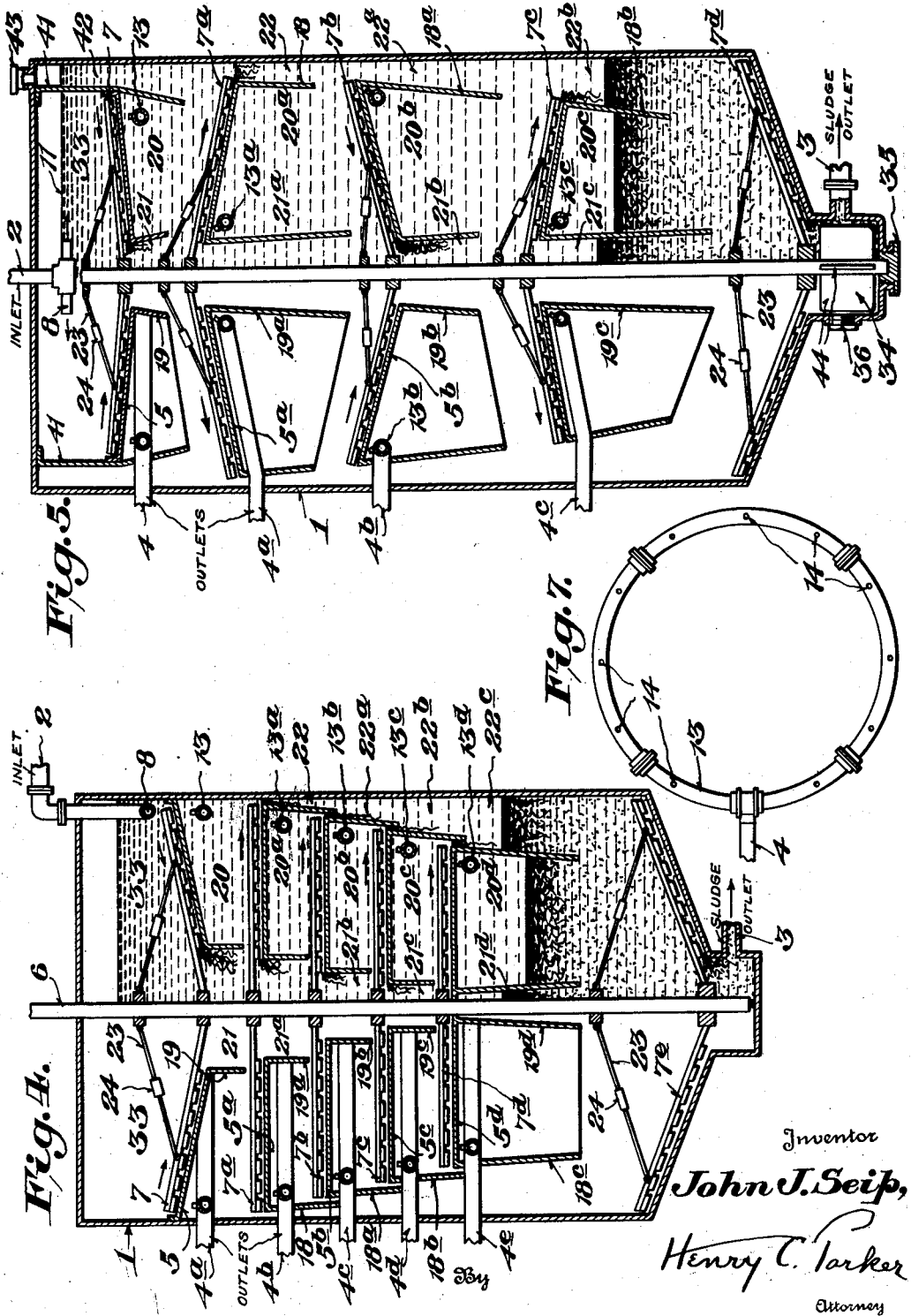

Patented Dec. 28, 1937

2,103,796

UNITED STATES PATENT OFFICE 2,103,796

APPARATUS FOR SEPARATING SOLIDS FROM LIQUIDS

John J. Seip, Allentown, Pa.

Application September 16, 1932, Serial No. 633,520
Renewed May 26, 1937

8 Claims. (Cl. 210—55)

This invention relates to process of and apparatus for separating solids from liquids; and it comprises an apparatus suitable for clarifying liquids or for separating finely divided solid matter from liquid suspensions thereof, such as are encountered in the defecation of cane and beet sugar juices, for example. My apparatus comprises a tank, usually cylindrical in shape, an inlet for liquids containing suspended matter at the top of said tank, means for separating said tank into a plurality of clarifying and discharge zones, the discharge zones being of increasing cross sectional area downwards and the clarifying zones being usually of increasing cross sectional area upwards, means for withdrawing clear liquor from within said clarifying zones and means for withdrawing sludge from the bottom of said tank.

The capacity of a multi-tray clarifier has been found to approach that of a series of settling tanks of similar size and of a number equaling the number of trays employed in the clarifier. Each tray, in effect, has been found to act as a separate sedimentation tank, insofar as its action is not interfered with by the operation of the remaining trays. Interference of the action of one tray by the operation of the remaining trays has been the one real difficulty experienced with the multi-tray type of clarifier. The lower trays of the devices used in the prior art have invariably become clogged with solids discharged from the upper trays.

I have found that the density of the suspension of solids in a multi-tray clarifier varies from tray to tray and invariably increases towards the bottom trays. The precipitated solids discharged from the upper trays invariably become redispersed to some extent upon dropping into the discharge conduits provided and this places an added burden upon the lower trays which are called upon to handle a liquid which is much thicker or denser in suspended solids. Moreover it is the more finely divided solids discharged from the upper trays which become redispersed and therefore the lower trays are required to clarify not only a denser suspension but also one having a larger proportion of fines.

Apparently the prior art has made no attempt to remedy this defect by a change in design of the lower trays. The result has been that the lower trays of prior art clarifiers have been rendered useless or at best have been greatly limited in their capacity for discharge of clear liquor. I have found that this grave defect of prior art devices can be remedied in an extremely simple manner.

I have found that the capacities of the trays in a multi-tray clarifier can be increased to a considerable extent merely by increasing the distance between them or, in other words, by increasing the depth of their clarifying zones. I advantageously provide the lower trays of my clarifier with depending flanges of progressively increasing length. This provides a greater distance through which suspended solids must rise to reach the clear liquor outlet, the result being that, even though there is a greater concentration of suspended solids in the lower clarifying zones, their tendency to rise is counteracted by the greater distance involved. By this simple expedient I have been able to devise for the first time a multi-tray clarifier having trays of equal clarifying capacity. I am even able to obtain, if desired, capacities from the lower trays of my clarifier greater than the capacities of the upper trays.

I have also found another method of increasing the capacity of a multi-tray clarifier. In the prior art the trays of such devices have been provided with vertical flanges or with flanges which have sloped in such a direction as to make a discharge passageway of gradually decreasing cross section through which the solids and liquid must pass. With such a design the velocity of flow of liquids and solids increases both in the discharge passageway as well as in the clarifying zone. I have found that, by reversing this slope, that is by providing flanges which converge inwardly towards the bottom of the clarifying zones, the velocity of flow can be made to decrease gradually both in the discharge passageways as well as in the clarifying zones themselves. The result obtained is a higher total clarifying capacity for a given volume tank. This effect can possibly be explained on the following basis:—With my new design the flow of liquid in the clarifying zone is of decreasing velocity upwards to a point close to the clear liquor discharge. Finely divided solids have a definite rate of fall in an undisturbed medium, the rate depending on the size, the density of the particle, etc. When the dispersion medium is flowing upwardly there is a critical size and density of particle above which the particles descend and below which they are carried upwardly with the flow of the dispersion medium. When the upward flow diminishes gradually, as in my design, the finer particles tend to rise to a point where the upward flow of liquid is just counterbalanced by their tendency to fall. These particles therefore tend to form in layers, segregated according to size and density. These layers of fine particles form an excellent filter for the rising dispersion medium. The agglomerating tendency of the particles reaches a maximum when they are in such a quiescent state of suspension. Any finer particles tending to rise through these quiescent layers are agglomerated with the particles which are temporarily in stable suspension. This forms larger particles which thus become flocculated. In prior art devices, where the velocity of the liquid increases upwardly in the clarifying zones there is no tendency for the solids to form in quiescent layers. The velocity of flow must therefore be below that required to carry even the finest of suspended matter upwardly, throughout the clarifying zones. However, I do not care to be bound to any theory of operation of my clarifiers and whatever the true explanation, the fact remains that larger capacities are obtained in a device of the character described.

With the discharge flanges sloped in a direction to produce conduits of increasing cross section downwards, any tendency of the solids to settle or collect on these discharge flanges is effectively eliminated. Discharge flanges having even a slight slope tending to narrow the discharge passageways frequently cause solids to build up at the restricted portions. Complete stoppage may result. This has frequently been my experience with clarifiers handling sugar juices in the cold-liming process, for example. In the most advantageous form of my invention I therefore provide discharge passageways or zones of gradually increasing cross section towards the bottom of the tank, not only by sloping the flanges in a direction reversed to that employed by the prior art, but also by having the successive trays stepped inwardly toward the bottom of the tank, the discharge passageways thus gradually increasing in cross sectional area.

I have also found that it is usually advantageous to have the precipitated solids discharged from the trays both at the center and at the periphery. This prevents the solids from building up at any one place and distributes them more uniformly over the bottom of the tank in which condition they may be readily discharged. I may arrange the trays alternately, one tray discharging at the center being placed above a tray discharging at the periphery.

I have found it usually advantageous to employ a top tray in the shape of a funnel discharging at the center, the periphery of this tray being coincident with the wall of the tank. This tray forms, with that portion of the wall which rises above the tray, a full-sized stilling chamber or equalizer which serves to smooth out any irregularities in the flow of liquid to be clarified. Rapid changes in flow, caused by irregularities in pumping, for example, are frequently encountered when clarifiers are placed in industrial use. It is also advantageous to have a central discharge for sludge at the bottom of the clarifier. When alternately discharging trays are employed with a top tray in the form of a funnel and a central discharge in the bottom of the tank, it will be seen that there is always an odd number of intermediate annular trays. When the latter are constructed with depending outer and inner flanges converging towards the bottom, a vertical cross section of the clarifier shows these trays in the form of double trapeziums with long sides and short sides alternately facing each other, as will be explained more fully later by reference to the drawings.

In the accompanying drawings I have shown, more or less diagrammatically, an assembly of apparatus elements within the purview of my invention and useful in the conduct of my process.

In this showing

Figs. 1, 2 and 3 are vertical sections through the most simple forms of single tray clarifiers constructed in accordance with my invention.

Fig. 4 is a vertical section of a multiple tray type with stepped inner and outer flanges and peripheral tray discharge.

Fig. 5 shows a multiple tray type with an alternate tray discharge.

Fig. 6 shows a multiple tray type with central discharge.

Fig. 7 is a plan view, on a reduced scale, of an advantageous clear liquor discharge collector, while Fig. 8 is an enlarged detail view, partly in section, of a collecting nipple used with the clear liquor discharge collector.

In the figures like elements are designated by like reference numerals. The essential elements of all embodiments of my invention comprise a tank 1, a liquor inlet designated generally as 2, a sludge outlet 3, a clear liquor discharge collector or collectors 4, 4a etc., a clarifying tray or trays 5, 5a etc., and a central shaft 6 for operating sweepers or scrapers 7, 7a etc., which serve to move solids along the trays and the bottoms of the tanks towards the sludge discharge outlets.

The tank 1 is usually cylindrical in form, but may, under certain circumstances, have a horizontal section which is square or rectangular in shape. The inlet 2, for liquid to be clarified, may take any convenient form but should be designed to deliver the liquid to the tank with minimum disturbance of the liquid contained therein. Any form of device which distributes the liquid horizontally beneath the liquid level of the tank in a slow flow is usually satisfactory.

In Figs. 1, 3, 4, and 5 and 6 the liquor inlet comprises merely a pipe with a horizontal branched connection 8. In Fig. 2 there is shown an inlet pipe 9 connected to a larger vertical tube 10 which surrounds the central shaft 6 and which leads to a point somewhat below the liquid level 11 of the tank. Just beneath the opening of the tube 10 a horizontal distributing disc or spreader 12 is placed. This disc deflects the liquid in a horizontal direction beneath the liquid level of the stilling zone 33.

The clear liquor discharge collector may also be of any usual form. It is advantageous to employ a device which collects clear liquid uniformly around the top of the clarifying zone without disturbance of the flow in any one place. For this reason I usually use a collecting ring 13 such as is shown in plan view on a reduced scale in Fig. 7. This merely comprises a pipe in ring form with spaced openings 14 to collect the clear liquor. I have found a convenient method of adjusting the effective height of the openings 14. I tap these openings and screw into them nipples 15, as shown in Fig. 8. The upper part of Fig. 8, shows a nipple with its upper part in section. The nipple is countersunk at the end opposite its threaded portion. This provides a sharp rim 16 and a sharply tapered inner portion 17. A sharp taper is required to prevent the collection of sediment at this point.

The sludge outlet may be made in conventional manner. A sludge pump (not shown) is usually provided in this outlet.

In Fig. 5 a special form of sludge discharge is shown, wherein what might be called a secondary compression chamber or catch-all 34, is employed. This is a bottom discharge chamber, sufficiently large to serve as a catch-all for broken scraper blades and arms, bolts, nuts, tools, etc. Stoppage of large clarifying machines during plant operation results in a serious loss, and the catch-all shown in this figure serves as a safety device for the elimination of many of the petty ills that result in the tie-up of less fool-proof machines. For tanks having diameters of 20 feet, I have found that secondary compression chambers having diameters of about 5 to 6 feet are desirable. These secondary compression chambers or catch-alls are provided at the bottom with a wash-out flange 35 and with a manhole 36 at the side for cleaning and the removal of any broken scraper blades, etc., which may happen to collect there. A large scraper 44 is usually provided in this chamber to keep the sludge in fluid suspension. In Fig. 6 there is shown another type of sludge discharge device especially adapted for the removal of heavy or thick sediment, sand, etc. This comprises a screw conveyor 37, attached centrally to the bottom of the tank. Openings 38 lead into the conveyor, the central shaft 6 being supported on a spider 39. The conveyor can be driven by any suitable means, such as by means of the pulley 40, driven by a source of power not shown.

The central shaft 6 of my clarifiers is rotated by conventional reducing gears and a source of power (not shown) and is driven at an extremely slow rate of speed usually not exceeding 3 revolutions per hour; this speed varying, of course, upon the density and type of material to be settled out.

The central shaft supports and drives a series of scraper arms 7, 7a, etc. These are provided at their under surfaces with rabbles or flights in any suitable form, such as angularly placed hoes or blades which gradually propel any precipitated solids radially across the trays and across the bottom of the tank. The scraper arms are fastened to the central shaft at one end and suspended at a midpoint by the suspensions 23 furnished with turnbuckles 24.

The trays 5, 5a, etc., may be either horizontal or dished or belled (crowned). They are usually, though not necessarily, provided with a central as well as a peripheral opening. These openings are provided with depending peripheral skirts or flanges 18, 18a, etc. and central aprons or flanges 19, 19a, etc. As shown in the various figures these flanges may be vertical or tilted slightly in a direction inwardly towards the bottom of the clarifying zones 20, 20a, etc. which are defined between them. The central flanges form central discharge zones or conduits 21, 21a, etc. and the outer flanges, with the wall of the tank, form peripheral discharge zones 22. In its most advantageous form my invention contemplates discharge zones of increasing cross sectional area downwards. This may be obtained by tilting the flanges slightly with the vertical or by having the trays stepped inwardly at the periphery towards the bottom of the tank. With the central discharge type the trays may be stepped outwardly, as shown in Fig. 6, making the openings successively larger towards the bottom of the tank.

The lengths of the flanges and hence the distances between the trays are advantageously increased towards the bottom of the tank. The lowest flanges, for example, should have a depth of at least 30 inches and, for some types of service, at least 48 inches. This is in contrast to upper flanges having lengths of from 15 to 18 inches.

With this general description of the various elements comprising my clarifier, I shall proceed to a more detailed description of certain specific embodiments and the operation thereof.

Figs. 1, 2, and 3 show a single tray type of clarifier. Fig. 1 has a belled or crowned tray with peripheral flange tapered inwardly to form, between itself and the wall of the tank, a peripheral discharge zone 22 of gradually increasing cross sectional area downwards. The liquid flows in at 2, is distributed in the upper stilling zone 33 by the branched pipe 8, it passes downwardly through the peripheral discharge zone at a gradually decreasing velocity, it then changes its direction of flow and rises through the clarifying zone 20, again with a gradually decreasing velocity, passing out at the collecting ring 13 and the pipe 4. The sediment deposited on the top of the tray 5 is scraped off by the sweepers 7. This falls through the discharge zone 22 and falls to the bottom of the tank. It is picked up here by the sweepers 7a, together with any additional sediment deposited on the bottom of the tank, and delivered to the sludge outlet 3.

At the left, the tank of Fig. 1 is shown equipped with an advantageous form of sampling device. This comprises a series of sampling pipes 25 running into the clarifying zone 20 with openings 26 arranged in fan formation. When the openings are arranged in this fashion the openings can be blown out with steam, if they become clogged, without making the liquid adjacent to the remaining openings turbid. The sampling pipes 25 usually are valved at 27 and pass into a sampling header 28. I usually draw off clear liquor from the clarifier at such a rate that the second or third sampling tube from the top delivers a slightly turbid liquor. In other words I regulate the flow to keep a layer of solids in suspension extending for some distance upwards into the clarifying zone. This layer then serves as a filter for the liquid, as described previously.

The tank in Fig. 1 is also shown equipped with a foam breaker which comprises a series of horizontal bars 29 to which there is attached a mat or screen 30 of wires, rope or other material, hanging downward in the form of a curtain or fringe. The bars 29 rotate with the central shaft, the screen serving to sweep along and break any bubbles floating on top of the liquor. The tank may also be provided with skimmers or with circumferential scum launders 31, with outlet 32, if desired.

Fig. 2 shows a single tray type of clarifier with central and peripheral discharge zones, the latter being of increasing cross section downwards. In this embodiment also the velocity of the liquid passing through the peripheral discharge zone acquires a gradually decreasing velocity, as well as when passing upwardly through the clarifying zone. The tray shown is dished with a central discharge. The clarifier would operate satisfactorily if the tray was belled and provided with a peripheral discharge.

In Fig. 3 I have shown another single tray modification having a single central discharge zone and a dished tray. The operation of this type is believed to be obvious from the preceding discussion.

In Fig. 4 there is shown a multiple tray type of clarifier with stepped trays, all save the top tray having a peripheral discharge. This construction provides a substantially equal precipitation of solids on all trays. This is caused by having a central discharge zone stepped inwardly and of decreasing cross sectional area downwards. A large proportion of the solids from the stilling zone 33 falls vertically downward, as shown by the shaded lines, spreading out more or less uniformly, on the various stepped trays as they fall. The piling up of solids on the lower trays is prevented by the stepping of the trays at the periphery. Tray 5a may have a distance, for example, of only 2 inches between its periphery and the tank wall; the tray 5b may have a corresponding distance of 3 inches, and so on. The outer flanges 18a, 18b, etc. may or may not be tilted at an angle to the vertical, producing a discharge zone of increasing cross section at this portion. The peripheral discharge zone, as a whole, increases in cross sectional area downward due to the stepping of the trays. The trays towards the bottom may be the same or this width may be stepped in either direction, the width either increasing or decreasing downwardly from tray to tray. It is also possible to have a central opening of uniform width in each tray, the trays being stepped only at their periphery, but this places an added burden on the lower trays.

Fig. 5 shows a particularly advantageous embodiment of my invention. As mentioned previously it is always advisable to have an upper tray in the shape of a funnel with rim coincident with the tank wall. An upper tray in the shape of a funnel always has a large capacity and takes care of a large proportion of the total clarification. It is also usually advisable to have a dished tank bottom with central discharge. The clarifier in Fig. 5 has these two features. The intermediate trays are alternately belled and dished, discharging from the periphery and to the center, respectively. This alternate discharge spreads the precipitated solids evenly over the bottom of the tank resulting in a better discharge. It will be noticed, as mentioned previously, that the vertical section of one of these trays takes the shape of two trapeziums having 4 unequal sides. This is due to the fact that the peripheral and central flanges converge downwardly. There is always an odd number of intermediate trays. In this type of clarifier it is usually advisable to space the lower trays somewhat further apart than the upper trays. The trays can be stepped, if desired, either at the periphery or centrally. The flanges may also be made vertical.

In Fig. 5 I have also illustrated a highly convenient method for washing or cleaning out the clarifiers. It will be noted that, at the periphery of the top tray 5 an upstanding flange 41 is provided which leaves an annular chamber 42 between itself and the side of the tank. This chamber is provided with spaced manholes 43 which can be removed when it is desired to wash or clean the clarifier. A stream of water or other liquid can be directed clear to the bottom of the tank. Any obstructions around the periphery of the tank can be readily removed by operations conducted through these manholes. The combination of these manholes with the secondary compression chamber or catch-all at the bottom of this tank makes the device of Fig. 5 the most easily cleaned and the most fool-proof of any of the types illustrated.

Fig. 6 illustrates still another modification of my invention. This clarifier has trays all of which are dished. As shown in the figure, the central openings are stepped downwardly. The flanges are also shown inclined outwardly towards the bottom. Both the stepping of the trays and the inclination of the flanges tend to produce a central discharge zone of increasing cross sectional area downwards. The flanges can be made vertical, if desired. In this type of clarifier I usually increase the length of flange and the spacing of the trays at the bottom. Otherwise it is difficult to obtain high capacities from the lower trays.

While I have illustrated a number of different forms which my invention can assume and have suggested others, there are many other embodiments which will be immediately evident to those skilled in the art. The number of trays, their dimensions, the direction of their slope, etc., can be varied widely. For certain types of service the sweeps may be dispensed with, if the slope of the trays is steep enough. The feed of the liquid to be clarified and the form of the clear liquor and sludge outlets may be varied to suit the exigencies of the particular problem involved. Scum draw-offs of different form may be provided. The shape of the tank, its height and diameter may all be changed. These and other modifications which fall within the scope of the appended claims form an inherent part of my invention.

What I claim is:

1. An apparatus for separating solids from liquids comprising a cylindrical tank, an inlet for liquids containing suspended matter at the top of said tank, at least one tray mounted substantially horizontally within said tank having a peripheral depending flange forming with the wall of said tank an annular discharge zone for solids and an inner clarifying chamber, the said flange being tapered in such manner as to produce a discharge zone of increasing cross sectional area towards the bottom of said zone, a clear liquor outlet located at an upper point of said clarifying chamber, a sediment draw-off located at the bottom of said tank, and means for moving precipitated solids towards said sediment draw-off.

2. A multi-tray clarifier having a series of trays of substantially equal clarifying capacity, comprising a tank, an inlet for liquids to be clarified at the top of said tank, a plurality of substantially horizontal trays provided with depending flanges mounted in said tank for separating the interior into a plurality of clarifying zones and corresponding discharge zones, the said depending flanges being of increasing length from tray to tray downwardly thereby producing clarifying zones of progressively increasing depth from zone to zone downwardly, a sludge draw-off located in the bottom of said tank, clear liquor draw-offs located within said clarifying zones, and means for moving precipitated solids towards said sludge draw-off.

3. An apparatus for separating solids from liquids, comprising a tank, an inlet for liquids containing suspended solid matter at the top of said tank, at least one tray mounted substantially horizontally within said tank with a depending peripheral flange forming an inverted chamber and serving to form with the wall of said tank a vertical discharge zone for solids between said flange and said wall of said tank, the said flange being tapered in such manner as to produce a peripheral discharge zone of increasing cross sectional area towards the bottom of said zone, a clear liquor outlet located at an upper point of said chamber, a sediment draw-off located at the bottom of said tank, and means for moving precipitated solids towards said sediment draw-off.

4. An apparatus for separating solids from liquids, comprising a tank, an inlet for liquid to be clarified at the top of said tank, a plurality of superimposed annular trays, having inner and outer depending flanges, mounted horizontally within said tank, the outer flanges being tapered centrally toward the bottom and the inner flanges of successive trays being stepped inwardly toward the center and the bottom of said tank forming progressively smaller central discharge zones, the outer flanges being also stepped inwardly toward the bottom of the tank forming progressively larger annular discharge zones between the walls of the tank and the said outer flanges, clear liquor draw-offs located beneath said annular trays, a sludge draw-off at the bottom of said tank and means for moving precipitated solids along the upper surfaces of said annular trays and towards said sludge draw-off.

5. An apparatus for separating solids from liquids, comprising a tank, an upper, horizontal, funnel-shaped tray mounted within said tank forming an upper stilling chamber with a central opening, a dished bottom for said tank having a central discharge opening for sludge, an odd number of annular trays mounted in said tank intermediate said upper tray and said bottom, the said annular trays having depending outer and inner flanges forming central and peripheral discharge zones, the said annular trays sloping alternately from the center outwardly and from the periphery inwardly, clear liquor draw-offs located beneath said trays and means for moving precipitated solids along said trays in the direction of the slope thereof and towards said sludge draw-off.

6. The apparatus of claim 3 wherein a funnel shaped tray with central opening is mounted in the top of said tank above said horizontal tray.

7. In an apparatus for separating solids from liquids, the combination of a tank, a plurality of settling trays mounted in said tank having depending peripheral flanges spaced from the wall of said tank, an upper tray having an upstanding peripheral flange also spaced from the wall of said tank and extending above the liquid level of the tank, the said depending flanges and the said upstanding flange forming an annular peripheral chamber, means at the top of said annular chamber for washing said trays, flanges and tank wall and catch-all means at the bottom of said tank.

8. An apparatus for separating solids from liquids comprising a cylindrical tank, an inlet for liquids containing suspended matter at the top of said tank, a plurality of trays mounted substantially horizontally within said tank having central depending flanges forming central discharge zones for said solids and clarifying zones surrounding said discharge zones, the said depending flanges being tapered in such direction as to produce discharge zones of increasing cross sectional area downwardly and clarifying zones of increasing cross sectional area in the direction of flow of liquid, said trays being stepped from tray to tray around said central discharge zones to produce discharge zones of increasing volume from zone to zone downwardly, clear liquor outlets located at upper points of said clarifying zones, a sediment draw-off located at the bottom of said tank, and means for moving precipitated solids towards said sediment draw-off.

JOHN J. SEIP.